Nov. 1, 1932.   G. B. GALLASCH   1,885,428
LIQUID LEVEL
Filed Jan. 7, 1929
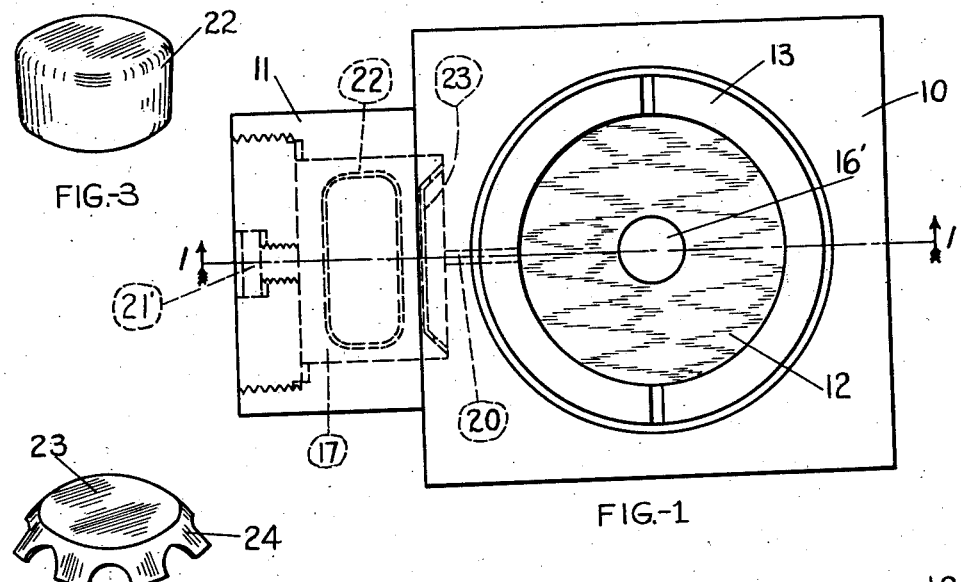
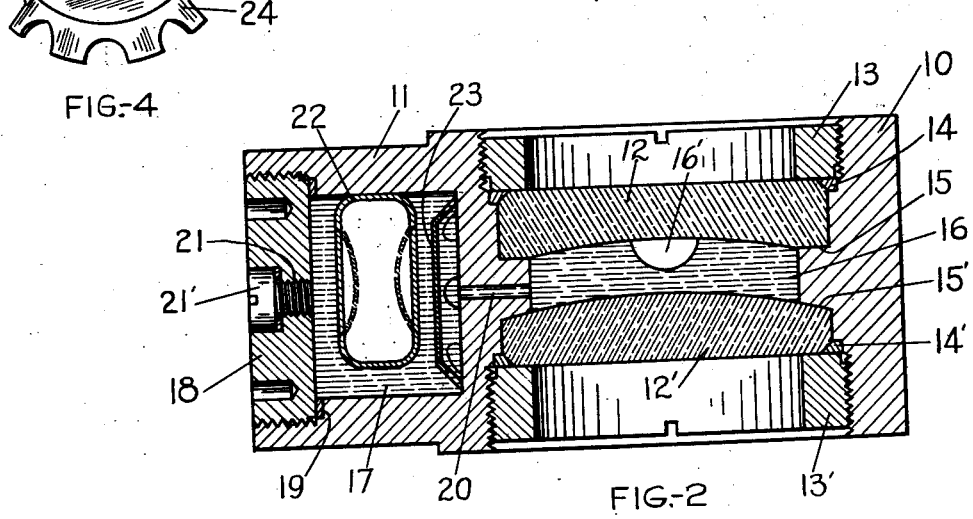
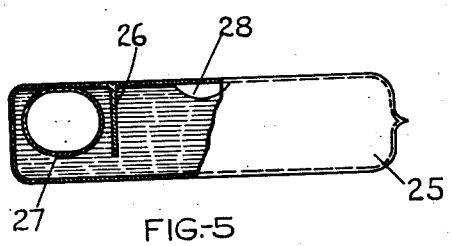
GEORGE B. GALLASCH.
INVENTOR
BY *G. A. Ellestad*
ATTORNEY Patented Nov. 1, 1932

1,885,428

UNITED STATES PATENT OFFICE

GEORGE B. GALLASCH, OF ROCHESTER, NEW YORK, ASSIGNOR TO BAUSCH & LOMB OPTICAL COMPANY, OF ROCHESTER, NEW YORK, A CORPORATION OF NEW YORK

LIQUID LEVEL

Application filed January 7, 1929. Serial No. 330,798.

This invention relates to liquid levels and more particularly it has reference to such types of bubble levels as are adapted for use in sextants, transits and other like instruments, although the invention is not restricted to use with instruments of this type.

In liquid levels of this type it is found that the size of the bubble varies with a change in atmospheric temperature. Thus, when the temperature rises, the liquid in the level expands and the bubble is reduced in size, whereas with a falling temperature the liquid is contracted in volume and the bubble expands to a larger size. Such variations in the size of the bubble are often of such an amount as to impair the usefulness and efficiency of the level, especially when the level is used on a bubble sextant, for example.

One of the objects of the present invention is to provide an improved and efficient liquid level in which the bubble will be compensated for temperature changes so that the bubble will have a substantially uniform size at different temperatures. Another object is to provide means for automatically maintaining the bubble of a level at a substantially uniform size at different temperatures. These and other objects reside in certain novel features of construction, arrangement and combination of parts as will hereinafter be more fully described and pointed out in the appended claims.

Referring to the drawing:

Fig. 1 shows a top plan view of one type of liquid level embodying my invention.

Fig. 2 shows a vertical sectional view taken on line 1—1 of Fig. 1.

Fig. 3 shows a perspective view of the container with flexible walls.

Fig. 4 shows a perspective view of a guard disk.

Fig. 5 shows a modification embodying my invention.

A preferred embodiment of my invention is illustrated in Figs. 1 to 4 wherein the numeral 10 indicates a casing having integral therewith a laterally disposed boss or projection 11. Removably secured within the casing 10 are the lens elements 12 and 12' which are held in place by the threaded retaining rings 13 and 13' which cooperate with gaskets 14 and 14' to make a tight joint. The lens elements 12 and 12' bear against shoulders 15 and 15', respectively, and are thereby held in spaced relation to form a bubble chamber 16 in which bubble 16' is contained.

The projecting boss 11 is bored out to provide a reservoir chamber 17 which is closed by the removable screw cap 18 which cooperates with gasket 19 to form a liquid-tight joint. The opening or conduit 20 provides a means of communication between the bubble chamber 16 and the reservoir chamber 17 so that liquid may flow from either chamber to the other. An opening 21, closed by screw 21', provides a convenient access to the chamber for the purpose of filling the chambers with liquid.

Positioned within the reservoir chamber 17 is the closed container or receptacle 22 which may take any desired shape, such as that shown in Fig. 3, for example. A disk 23, having a perforated down-turned edge 24, is placed in chamber 17 to prevent the container 22 from blocking the conduit 20. The wall or walls of the container are very thin and flexible so they will readily yield and respond to slight pressures. The container may be made of any suitable material such as gelatine or a cellulose substance, for example. It is obvious, of course, that the material forming the container must be insoluble in the liquid which is contained in the reservoir and bubble chambers. Thus, a container made of gelatine can be used in a reservoir chamber which contains xylol. The container may, however, be covered with a very thin deposit of a metal, such as silver, for example, in order to protect the container from being dissolved.

A fluid substance such as air, gas or vapor is enclosed within the sealed container 22. Preferably, the container 22 is only partly filled with the fluid substance so that the walls will be partially collapsed, as shown in the dotted lines in Fig. 2, thereby providing a latitude for expansion or contraction of the walls of the container. The container 22 is preferably sealed up at normal room temperature and the substance enclosed therein is under atmospheric pressure. The container 22 has a cubical content which is many times larger than that of the bubble 16'.

In assembling the level, a suitable liquid, such as xylol, for example, is filled into the bubble chamber 16 so that a bubble 16', of the desired size, is formed. The container 22 is then placed in chamber 17, liquid is added so as to almost fill the chamber and the cap 18 is then screwed into place. Liquid is then added through opening 21 to completely fill the chamber and exclude all traces of air, after which the screw 21' is inserted.

When the level is subjected to a temperature which is higher than normal room temperature, the liquid in the level will expand and the force will tend to reduce the size of the bubble 16'. The force of such expansion, however, will be distributed throughout the liquid in both chambers 16 and 17. Since the container 22 has a relatively large surface area in contact with the liquid, the thin, yieldable walls of the container will be compressed and the force due to the expansion of the liquid will be substantially absorbed by container 22 so that the change in size of bubble 16' will be practically negligible. Similarly, when the level is subjected to a lower temperature, the liquid will be contracted and the walls of container 22 will expand so that the bubble will retain a substantially uniform size.

In Fig. 5 I have shown a modification which illustrates the application of my invention to a liquid level of the tubular type. The level comprises a tubular member 25 having a wall or partition 26 disposed therein so as to provide a chamber for the container 27. The container 27 has very thin yieldable walls and encloses a fluid substance such as air, gas or vapor. The volume of the container 27 is many times that of the bubble 28. It will be readily understood that the level of Fig. 5 will operate similarly to that shown in Figs. 1 and 2 so that the bubble 28 will retain a substantially uniform size despite changes of temperature It will be apparent from the foregoing that my invention provides a means whereby the bubble in a liquid level will remain of a substantially uniform size even though subjected to different temperatures. It will also be apparent that my device is automatic in operation and hence, after the level is properly filled, it is unnecessary to make any further adjustments to compensate for the change in size of the bubble due to temperature changes.

From the above description it will be noted that I am able to attain the objects of my invention and provide an improved liquid level having an automatic compensating device which will maintain the bubble at a substantially uniform size under different temperatures. It is obvious that various modifications can be made without departing from the spirit of my invention as pointed out in the appended claims.

I claim:

1. A liquid level comprising means providing a bubble chamber, a reservoir chamber, and a passageway connecting said chambers, a closed container in said reservoir chamber, said container having yieldable walls and a gaseous substance enclosed therein.

2. A liquid level comprising communicating bubble and reservoir chambers, a receptacle disposed within said reservoir chamber, said receptacle having a yieldable wall and containing a gaseous substance, the cubical contents of said receptacle being several times greater than that of the bubble.

3. A liquid level comprising a bubble chamber containing a liquid and a bubble, a closed receptacle having a yieldable wall, said receptacle containing a gaseous substance, means for putting said yieldable wall in communication with the liquid in said bubble chamber whereby the yieldable wall compensates for changes in volume of the liquid thereby keeping the bubble at a substantially uniform size at different temperatures.

4. A liquid level comprising a casing, glass members mounted in said casing to provide a bubble chamber, a projecting boss on the side of said casing, said boss having a recess which provides a reservoir, means having a passageway connecting said chamber and reservoir, a container within said reservoir, said container having a yieldable wall, and means for limiting the movement of said container within said reservoir.

GEORGE B. GALLASCH.